(No Model.)
E. F. GRAY.
APPARATUS FOR VIGNETTING.
No. 581,279. Patented Apr. 27, 1897.
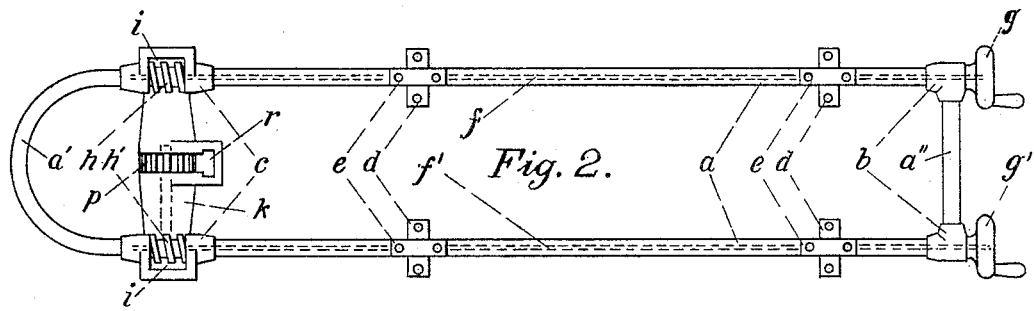
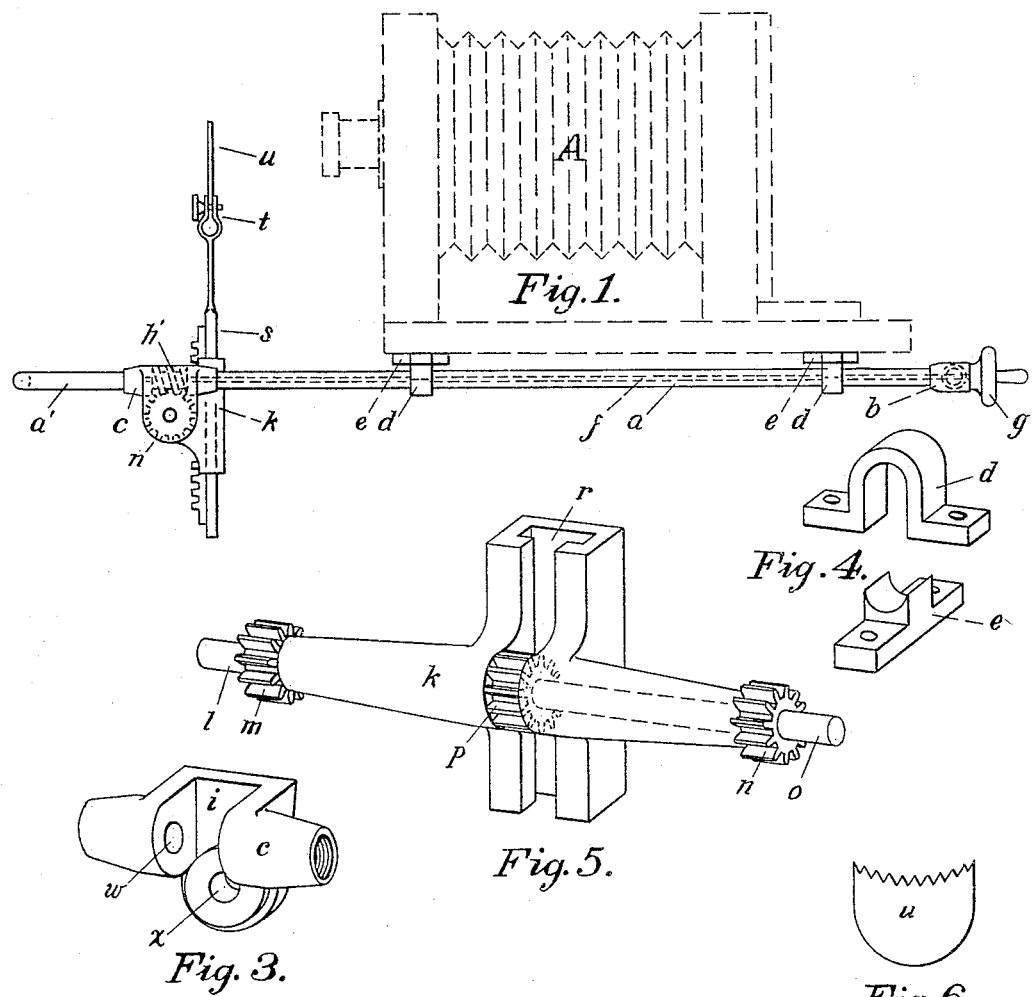
WITNESSES:
Geo. A. Fairbanks.
W. H. Ford
INVENTOR
Eugene F. Gray

UNITED STATES PATENT OFFICE.

EUGENE F. GRAY, OF WATERTOWN, NEW YORK.

APPARATUS FOR VIGNETTING.

SPECIFICATION forming part of Letters Patent No. 581,279, dated April 27, 1897.

Application filed February 1, 1896. Serial No. 577,655. (No model.)

*To all whom it may concern:*

Be it known that I, EUGENE F. GRAY, a citizen of the United States, and a resident of Watertown, in the county of Jefferson and State of New York, have invented a new and useful Improvement in a Camera Vignetting Attachment, of which the following is a specification.

My invention relates to improvements in camera vignetting attachments by means of which the negative is vignetted in the camera at the time of exposure to the desired shade or blending of the background used. Negatives thus produced possess great advantages over negatives made in the ordinary way and used in connection with a vignetting attachment at time of printing in that they allow of plain or solid printing, produce better work, and save much time in printing.

The objects of my improvements are to provide convenient means of quickly and accurately adjusting the vignetting-screen from the rear of camera at time of focusing, the effects of such adjustments being plainly visible on the ground glass as they are being made. I attain these objects by the mechanism illustrated in the accompanying drawings, in which—

Figure 1 represents a side view of the attachment, showing manner of attaching it to the camera, which is indicated by broken lines and marked A. Fig. 2 represents a plan view of the attachment without the rack, clip, and screen. Fig. 3 shows a perspective view of connecting-piece. Fig. 4 shows a perspective view of strap and block used in attaching device to camera. Fig. 5 represents rock-shaft with accompanying parts. Fig. 6 shows one form of vignetting-screen, although any other familiar form of screen may be used instead.

Similar letters refer to similar parts throughout the several views.

The parts $a$, $a'$, and $a''$, consisting, preferably, of metal tubing, are connected by screwing, soldering, or brazing with the elbows $b$ and connecting-pieces $c$, forming a frame, which is hung from the under side of the camera by the straps $d$ and supported by the blocks $e$, through which it is free to move longitudinally. Round rods $f$ $f'$, passing through and revolving freely in the elbows $b$, the tubes $a$, and partially through the connecting-piece $c$, entering into hole $w$, have immovably attached at one end hand-wheels $g$ and $g'$, respectively, and near the other end have fastened in a similar manner the worms $h$ and $h'$, respectively, which turn freely in the slot $i$ of connecting-piece $c$. The rock-shaft, substantially in form as shown in Fig. 5, is provided in the center with a T-slot $r$, and has immovably attached at the end of one arm the spindle $l$ and worm-wheel $m$, as shown. Through the other arm of rock-shaft $k$ passes the spindle $o$, the outer end of which forms a bearing, near which is attached the worm-wheel $n$, while near the inner end is attached the spur-gear $p$, which revolves in slot $r$, meshing with gear $p$ and being actuated thereby. It is prolonged to form the support for the vignetting-screen. At its upper end is shown a clip $t$ for holding the screen. The rock-shaft $k$, with its attendant parts $l$, $m$, $n$, $o$, and $p$, is hung in the connecting-pieces $c$ by the spindles $l$ and $o$, passing through the holes $x$, in such a manner that the gear $m$ meshes with worm $h$ and the gear $n$ with the worm $h'$, each gear being actuated by its corresponding worm.

In using this attachment the operator at time of focusing by taking hold of the frame at $a''$ slides it in or out until the vignetting-screen is at the proper distance from the lens. The hand-wheel $g'$ is then turned, which, by means of rod $f'$, worm $h'$, worm-wheel $n$, spindle $o$, and spur-gear $p$, adjusts the screen to the proper height. The screen can then be inclined to the proper angle for giving the desired blending by turning the hand-wheel $g$, which, by means of the rod $f$, worm $h$, and worm-wheel $m$, causes rock-shaft $k$ to rotate.

What I claim as my invention, and desire to secure by Letters Patent, is—

1. In a camera vignetting device, the combination of a vignetting-screen, a support therefor, a rack and gear for raising and lowering said support, a rock-shaft, gearing for rotating said rock-shaft, a frame, and straps through which the frame is free to slide, and which fasten it to the camera, substantially as set forth.

2. In a camera vignetting device the combination of a vignetting-screen, a support therefor, a rack and gear $p$ for raising and lowering said support, gearing $n\ h'$ and shaft $o$ connected to said gear $p$, a rock-shaft $k$ and gearing $m\ h$, substantially as and for the purpose set forth.

3. In a camera vignetting device the combination of a vignetting-screen, a support therefor, a rock-shaft, gearing $m\ h$ and $n\ h'$ and a hollow frame through which pass rods for operating said gearing, substantially as and for the purpose set forth.

In testimony that I claim the foregoing as my invention I have signed my name, in presence of two witnesses, this 24th day of January, 1896.

E. F. GRAY.

Witnesses:
 EDWARD HARRINGTON,
 FRED A. ROSEBOOM.